(12) United States Patent
Korn

(10) Patent No.: US 10,954,793 B2
(45) Date of Patent: Mar. 23, 2021

(54) SYSTEM AND METHOD FOR BALANCING A ROTOR IN AN ASSEMBLED ENGINE

(71) Applicant: United Technologies Corporation, Farmington, CT (US)

(72) Inventor: Nathan D. Korn, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 274 days.

(21) Appl. No.: 16/014,214

(22) Filed: Jun. 21, 2018

(65) Prior Publication Data
US 2019/0390552 A1    Dec. 26, 2019

(51) Int. Cl.
| | | |
|---|---|---|
| *F01D 5/02* | (2006.01) | |
| *F02C 7/22* | (2006.01) | |
| *F04D 29/66* | (2006.01) | |
| *F16F 15/34* | (2006.01) | |

(52) U.S. Cl.
CPC ............... *F01D 5/027* (2013.01); *F02C 7/22* (2013.01); *F04D 29/662* (2013.01); *F16F 15/34* (2013.01); *F05D 2220/32* (2013.01); *F05D 2240/24* (2013.01); *F05D 2260/15* (2013.01)

(58) Field of Classification Search
CPC ........... F01D 5/027; F16F 15/62; G01M 1/36; B64C 27/008
See application file for complete search history.

(56) References Cited

U.S. PATENT DOCUMENTS

| | | | | |
|---|---|---|---|---|
| 5,545,010 A | * | 8/1996 | Cederwall | ............... F01D 5/027 415/201 |
| 6,279,420 B1 | | 8/2001 | Knorowski et al. | |
| 7,465,146 B2 | | 12/2008 | Kennedy et al. | |
| 9,017,029 B2 | * | 4/2015 | Pichel | ...................... F01D 5/027 416/144 |
| 9,127,555 B2 | * | 9/2015 | Muscat | ................... F01D 9/042 |
| 9,938,832 B2 | * | 4/2018 | Bakker | ................... F01D 5/027 |
| 2017/0292380 A1 | * | 10/2017 | Diwinsky | ............. F01D 25/285 |

FOREIGN PATENT DOCUMENTS

| | | |
|---|---|---|
| EP | 1602855 A2 | 12/2005 |
| EP | 2520767 A1 | 11/2012 |
| FR | 2630496 A1 | 10/1989 |

OTHER PUBLICATIONS

European search report for patent application No. EP 19 18 1006.8 dated Oct. 31, 2019.

* cited by examiner

*Primary Examiner* — Nathaniel E Wiehe
*Assistant Examiner* — Jackson N Gillenwaters
(74) *Attorney, Agent, or Firm* — Bachman and Lapointe PC; George Coury

(57) ABSTRACT

A balance system for an assembled engine includes a rotor mounted on a shaft for rotation within an engine casing having an inner case and an outer case; and a weight system mounted on the shaft of the rotor and having at least one weight positionable relative to the rotor around a circumference of the shaft; wherein the inner case has an inner access port, the outer case has an outer access port, and the inner access port, the outer access port and the weight system are positioned on the same radial plane of the rotor, whereby the weight system can be accessed through the outer port and the inner port to adjust circumferential position of the at least one weight relative to the rotor.

17 Claims, 4 Drawing Sheets

SYSTEM AND METHOD FOR BALANCING A ROTOR IN AN ASSEMBLED ENGINE

BACKGROUND OF THE DISCLOSURE

The disclosure relates to balancing of gas turbine engines and, more particularly, to balancing of the high speed rotor of an assembled gas turbine engine.

The problem that this disclosure addresses is the inability to adjust the trim balance of the high speed rotor of a gas turbine engine with more than one rotor. Current designs do not provide access to adjustable balance features on the high speed rotor. If an engine either after initial assembly, maintenance, or time in operation exhibits high vibration due to an imbalance in the high speed rotor, the engine will have to be removed from the test cell, or from service, and significant disassembly will be required to allow access to adjust the trim balance weights on the high spool. In exemplary engines, correcting a high rotor vibration requires, at a minimum, separating the low pressure turbine, at least one bearing, the mid turbine frame, and the high pressure turbine.

Efforts have been made to address this problem, for example as disclosed in U.S. Pat. No. 9,938,832. However, the need remains for a solution wherein balancing can be accomplished effectively, without disassembling the engine and/or otherwise removing the engine from the test cell or from service, and wherein a minimum number of parts are actually installed and removed during balancing.

SUMMARY OF THE INVENTION

The present disclosure provides a balance system for an assembled engine, which comprises a rotor mounted for rotation on a shaft within an engine casing having an inner case and an outer case; and a weight system mounted on the shaft and having at least one weight positionable relative to the rotor around a circumference of the shaft; wherein the inner case has an inner access port, the outer case has an outer access port, and the inner access port, the outer access port and the weight system are positioned on the same radial plane of the rotor, whereby the weight system can be accessed through the outer port and the inner port to adjust circumferential position of the at least one weight relative to the rotor.

In one non-limiting embodiment, the weight system comprises a rail mounted around at least a portion of the circumference of the shaft, and wherein the at least one weight is mounted to the rail and has a lock structure for locking the weight in position relative to the rail, wherein the lock structure can be locked and unlocked through the inner access port and the outer access port.

In another non-limiting embodiment, when the lock structure is unlocked, the at least one weight can be moved along the rail, and when the lock structure is locked, the at least one weight is fixed in place on the rail.

In another non-limiting embodiment, the at least one weight can be accessed from outside the engine casing in a straight line through the outer access port and the inner access port.

In another non-limiting embodiment, the rotor has a plurality of blades mounted around the shaft, and the weight system is spaced axially from the blades.

In another non-limiting embodiment, the engine is a gas turbine engine, and the rotor is a high speed rotor of the gas turbine engine.

In another non-limiting embodiment, the rotor is a high pressure compressor of the engine.

In another non-limiting embodiment, the engine has a plurality of rotors positioned along an axis of the engine, and the rotor is an intermediate rotor along the axis.

In another non-limiting embodiment, at least one of the outer access port and the inner access port is a borescope port.

In another non-limiting embodiment, the outer access port is a fuel injector port or mount pad.

A method is also provided for balancing a rotor for an assembled engine, comprising the steps of accessing a weight system of a rotor mounted on a shaft for rotation within an engine casing having an inner case and an outer case, the weight system being mounted on the shaft and having at least one weight positionable relative to the rotor around a circumference of the shaft, the inner case having an inner access port, the outer case having an outer access port, and the inner access port, the outer access port and the weight system being positioned on the same radial plane of the rotor; and changing circumferential position of the at least one weight relative to the rotor.

In a non-limiting embodiment, the weight system comprises a rail mounted around at least a portion of the circumference of the rotor, and the at least one weight is mounted to the rail and has a lock structure for locking the weight in position relative to the rail, wherein the lock structure can be locked and unlocked through the inner access port and the outer access port, the method further comprising the steps of: accessing the lock structure from outside the engine casing, through the outer access port and the inner access port; unlocking the lock structure; moving the at least one weight along the rail to a different circumferential position relative to the rotor; and locking the lock structure.

In a further non-limiting embodiment, the unlocking step comprises unlocking the lock structure with an implement inserted from outside the engine casing through the outer access port and the inner access port, and the moving step comprises holding the at least one weight in place with the implement while the rotor is rotated so at to move the at least one weight to the different circumferential position.

In a further non-limiting embodiment, the rotor has a plurality of blades mounted around the shaft, and the weight system is spaced axially from the blades.

In a further non-limiting embodiment, the engine is a gas turbine engine, and the rotor is a high speed rotor of the gas turbine engine.

In a further non-limiting embodiment, the rotor is a high pressure compressor of the engine.

In a further non-limiting embodiment, the engine has a plurality of rotors positioned along an axis of the engine, and the rotor is an intermediate rotor along the axis.

In a further non-limiting embodiment, the accessing and changing steps are carried out while the rotor is in a use position within the engine casing.

In a further non-limiting embodiment, the outer access port is a fuel injector port, and the method further comprises the step of removing a fuel injector from the fuel inject port to allow access through the fuel injector port.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

The invention relates to a system and method for balancing a rotor of an engine such as a gas turbine engine, and more particularly to a system and method for balancing a high speed rotor of a multi-rotor engine while the engine is assembled and with the rotor in a position of use within the engine.

Figure 1:
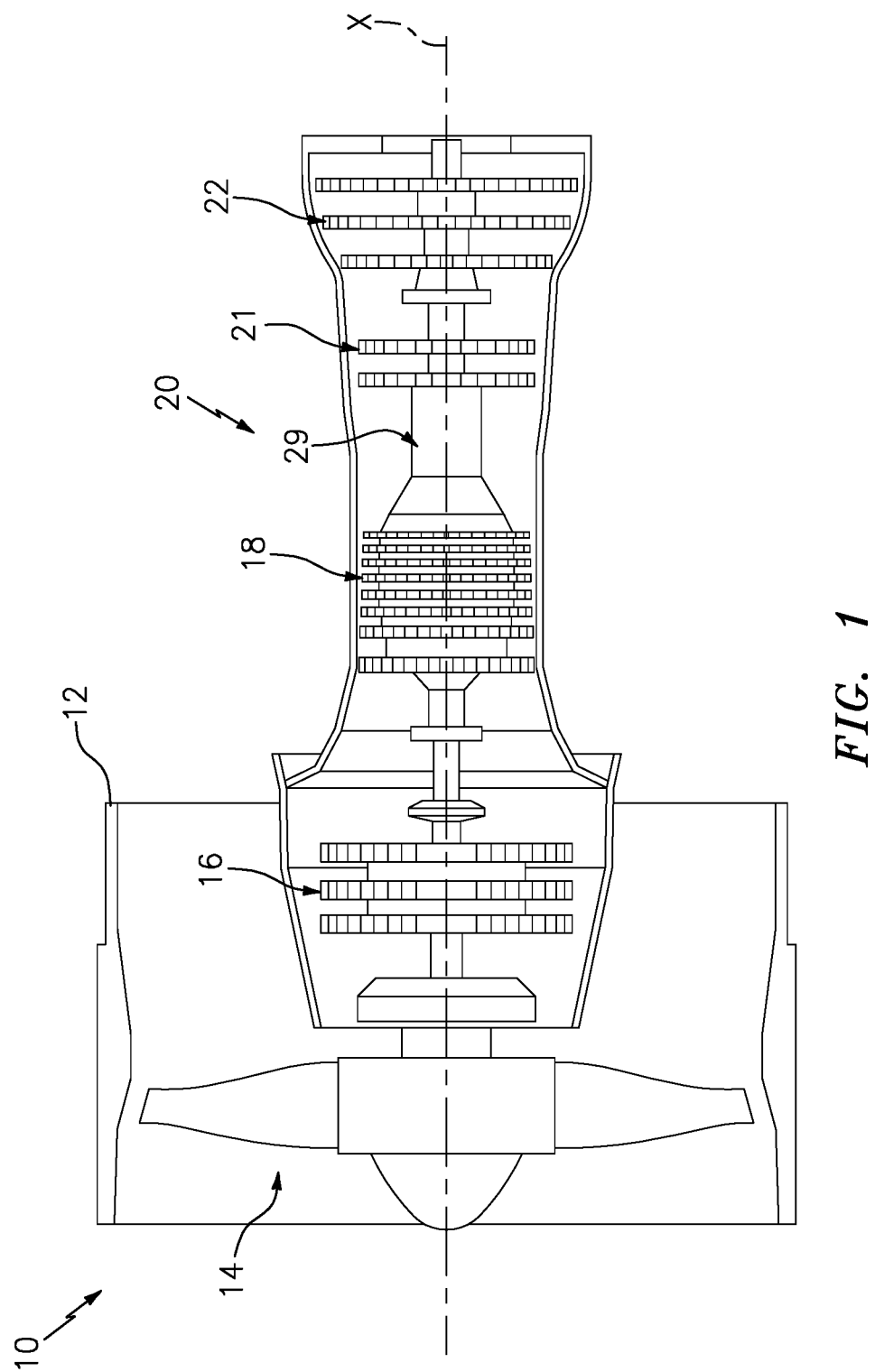
FIG. 1 illustrates general features of a typical engine on which the system and method of the disclosure find suitable use.

FIG. 1 illustrates a gas turbine engine 10 which is a non-limiting example of an engine on which the system and method of the present disclosure find advantageous use. Engine 10 has a series of rotating components, or rotors, within a housing or casing 12. These rotating components include a fan 14 at a leading edge of engine 10, followed by low pressure compressor 16, high pressure compressor 18, a combustor 20, high pressure turbine 21 and low pressure turbine 22. These components must be balanced so that they are free of vibrations during operation. Frequently, vibrations develop during use such that various components must be balanced after use, during the various other steps to be performed in maintenance of an engine.

Weight systems are typically used to balance the rotating components of engine 10. When the component to be balanced is at a leading or trailing edge of engine 10, the balancing system can, for the most part, be readily accessed by maintenance personnel. However, for intermediate rotating components of the engine, such as the high pressure compressor 18, as one non-limiting example, it can be difficult or impossible to access a balancing system of this component without the need for time consuming disassembly of the engine, or components thereof.

Figure 3:
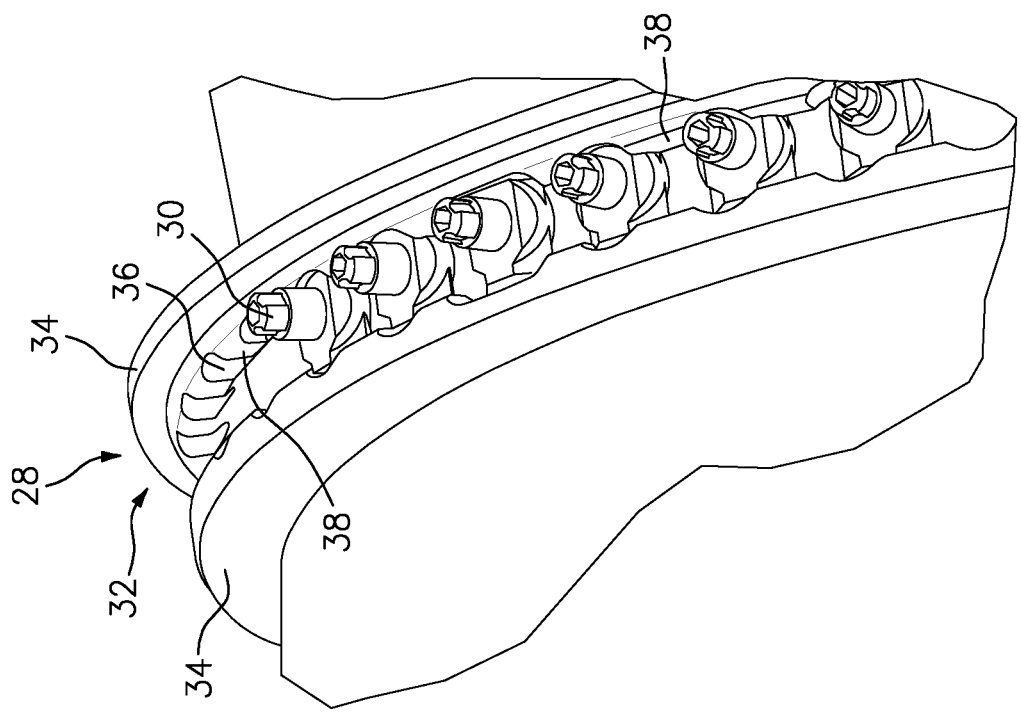
FIG. 3 illustrates a non-limiting configuration of an adjustable weight system for use in the present disclosure.
Figure 2:
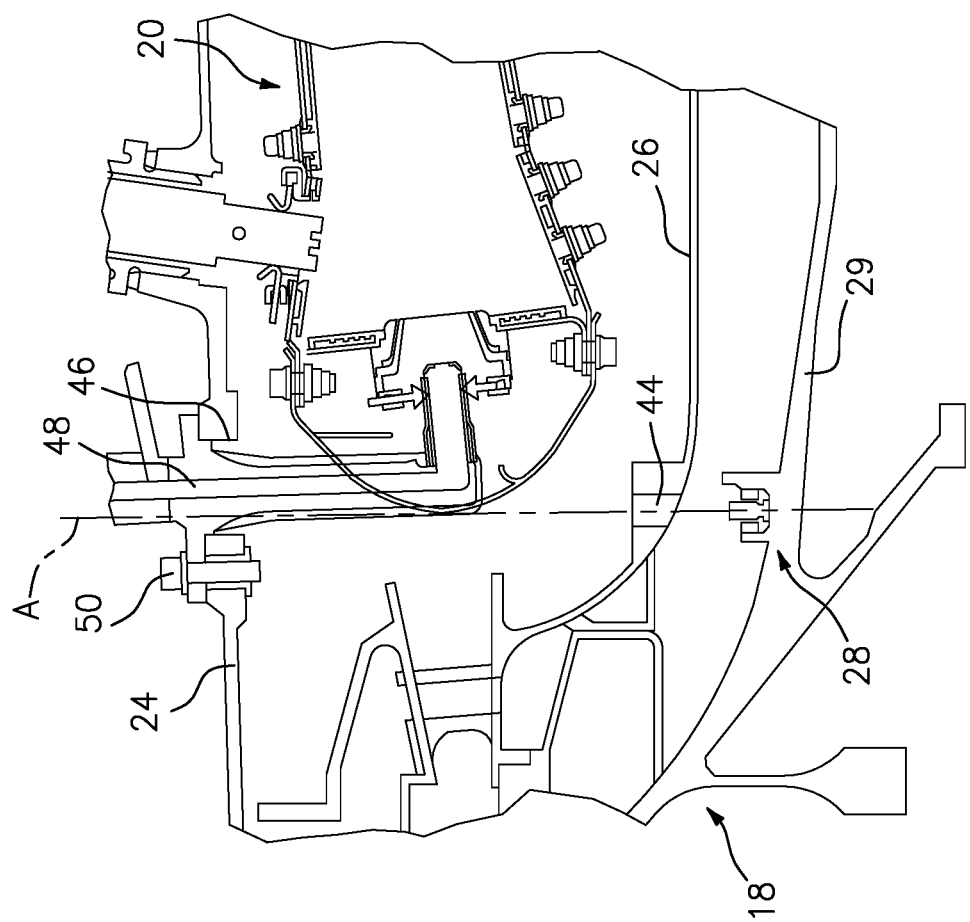
FIG. 2 illustrates an enlarged portion of the engine of FIG. 1 and shows a non-limiting configuration of the balance system of the present disclosure.
Figure 4:
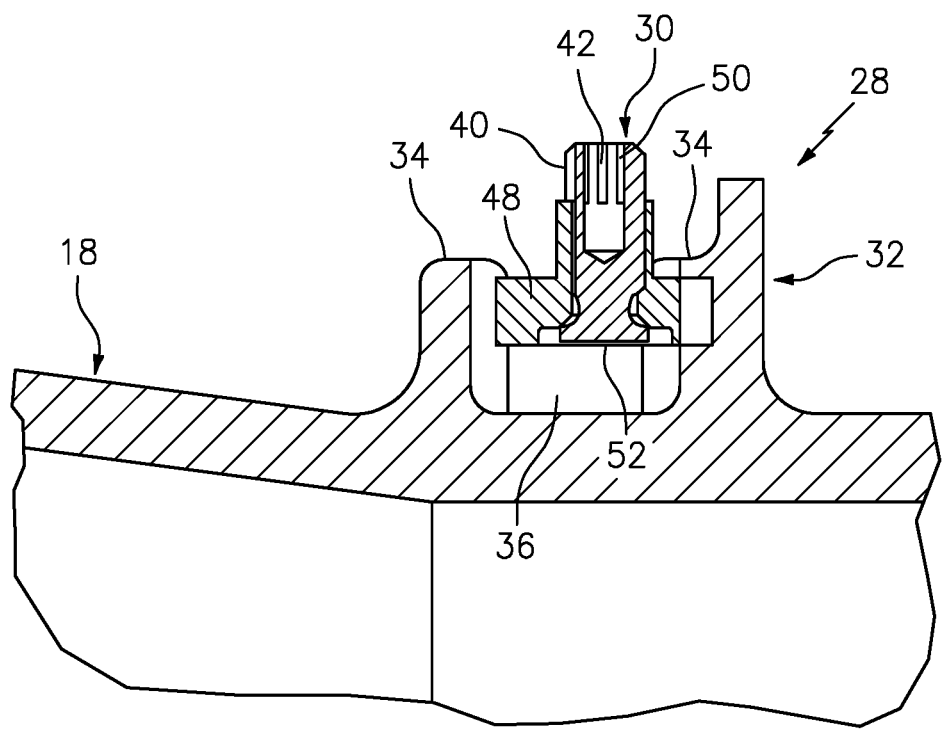
FIG. 4 is a side sectional view through a weight of the adjustable weight system of FIG. 3.
Figure 5:
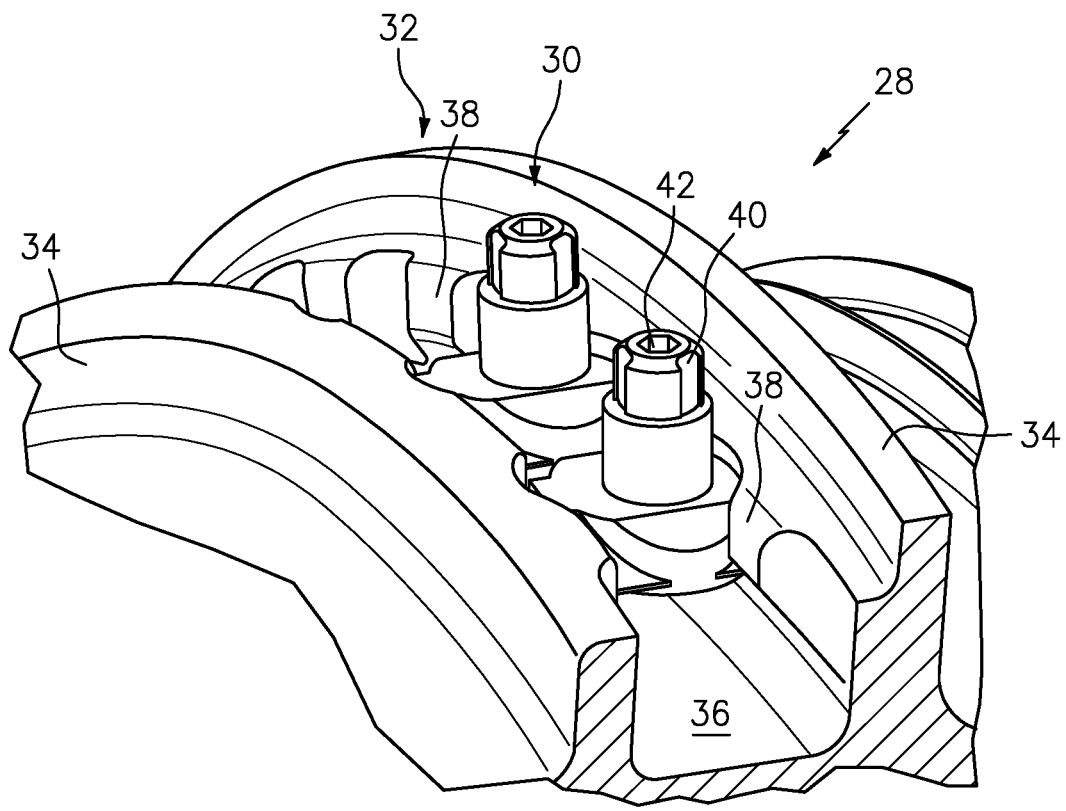
FIG. 5 is a further enlarged view of a portion of the adjustable weight system of FIG. 3.

FIG. 2 is an enlarged portion of engine 10 and shows a portion of the high pressure compressor 18 mounted within casing 12 which in this case includes an outer case 24 and an inner case 26. FIG. 2 also shows a weight system 28 mounted on a shaft 29 just behind the blades of high pressure compressor 18 and which can be used to balance the high pressure compressor 18 and thereby prevent vibration during operation of engine 10. Referring also to FIGS. 3-5, weight system 28 has at least one weight 30 mounted within a rail 32 which extends around at least a portion of the circumference of shaft 29 behind the blades of high pressure compressor 18. Weights 30 can be held in place with a simple set screw structure or any other structure which can be accessed from outside casing 12. In order to balance the rotor, one or more weights 30 are moved to different positions around the circumference of shaft 29 until a desired balance is achieved. FIG. 3 shows more detail as to how this is accomplished. As shown, rail 32 can be defined by a pair of radially extending walls 34 which are spaced from each other along an axis of engine 10 so as to define a weight track or space 36 therebetween. Walls 34 can have inwardly extending structures 38, extending toward the opposing wall, so as to define a series of ridges or otherwise defined positions at which weights 30 can be secured.

Weights 30 have structure for being engaged by a tool, in this case outer flats 40 for engaging with a socket type tool, and also an inner structured aperture 42 for engaging with a bladed or pronged tool. These structures are for engaging weight 30 and rotating at least a portion of weight 30 between a locked position and an unlocked position. In the locked position, weight 30 is fixed within the rail. In an unlocked position, weight 30 can be moved along rail 32 so as to change the circumferential position of weight 30 relative to rotor 18. This positioning of weights 30 allows for balancing of rotor 18 against vibrations and the like.

FIG. 3 shows rails 32 extending around a circumference of shaft 29. A plurality of weights 30 are shown spaced along rails 32, between walls 34, and secured in place against inwardly extending structures 38.

FIG. 4 shows a cross section taken through one of the weights 30, for example as shown in FIG. 3. FIG. 4 shows an inner structure of weight 30, wherein a weight body 48 has a diameter which extends beyond inwardly extending structures 38 of walls 34. Further, a threaded portion 50 of weight 30 can be rotated relative to weight portion 48, such that portion 50 can be tightened down through the weight body 48 to the point where a bottom portion 52 of screw 50 contacts a floor within space 32, to press weight portion 48 against inwardly extending structures 38 to secure the weight in place. Of course, loosening screw 50 relative to weight portion 48 serves the function of unlocking the weight from the locked position, wherein the weight is secured against moving along rail 32.

FIG. 5 shows an enlarged view similar to that of FIG. 3, wherein weights 30 are shown secured between walls 34 of rail 30.

The drawings show the structure of one non-limiting example of weights 30 which are suitable for use in the system of the present disclosure. Other structures and configurations for locking and unlocking weights 28 are of course possible.

The actual structure of weights 30 including how such weights are locked and unlocked can vary within the scope of the present disclosure, and this, many different configurations allowing weights to be adjusted circumferentially around rotor 18 will be apparent to a person having ordinary skill in the art.

Referring back to FIG. 2, the present system and method allow for accessing and adjusting circumferential position of one or more weights 30 while engine 10 is in an operating position, either within a test cell or installed on an aircraft. This is accomplished by positioning weight system 28 in a plane A with an inner port 44 on inner case 26 and an outer port 46 on outer case 24. This positioning of weight system 28 and ports 44, 46 allows for accessing of the weight system from outside of the engine casing 12, through ports 44, 46. Further, the weight system being of the type where weights are moved circumferentially around shaft 29 allows adjustment of the weight system by unlocking and moving weights 30 along rail 32, which avoids removing and replacing of weights with other weights, and also avoids the need for specialty tools, all of which can lead to issues including the loss of tools or parts within the engine casing 12, which of course must be located and removed before any operation of the engine can take place. Some engine casings already have one or more ports, which can for example be borescope ports. According to the present disclosure, ports 44, 46 are positioned in plane A along with weight system 28 such that the weight system can be accessed from outside casing 12 of engine 10, and such access is generally along a straight line which helps to allow adjustment of weight system 28.

Still referring to FIG. 2, in this configuration, port 46 is a port which holds a fuel injector 48. Fuel injectors 48 can be removed from the outer case on-wing, by removing bolts 50 which secure them to outer case 24. With injector 48 removed, port 46 has ample size to allow access through port 44 to weight system 28 along a substantially straight line (in plane A). It should also be noted that it may be desired to provide a plug for port 44 of inner case 26. This plug is to be removed from port 44 in the course of accessing weight system 28, but serves to close port 44 during operation of engine 10.

Figure 6:
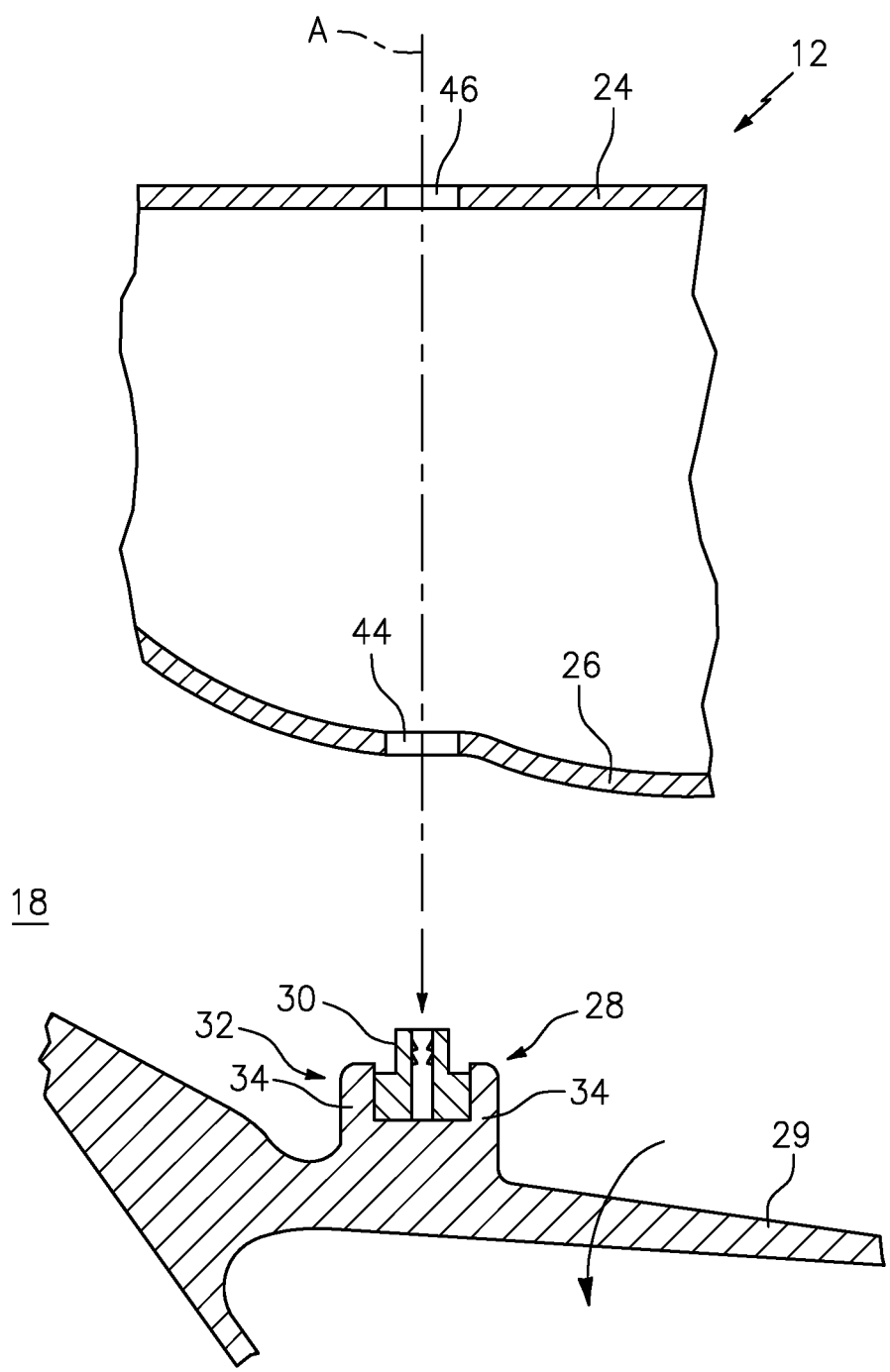
FIG. 6 is a further illustration of a non-limiting embodiment of the system and method of the present disclosure.

FIG. 6 schematically illustrates a non-limiting example of operation of the system and method, in this case on an intermediate rotor, specifically the high pressure compressor 18. As shown, weight system 28 is mounted on a shaft 29 behind the rotor of the high pressure compressor 18, in this case downstream or behind the location of blades on the rotor. This is advantageous in that it allows rail 32 to extend around an entire circumference of shaft 29, rather than between blades of the rotor, such that adjustment of position of a weight within the rail can be accomplished without needing to disassemble blades. Further, rail 32 is positioned in a plane A, in this case perpendicular to axis X of engine 10, with inner port 44 of inner case 26 also located in plane A, and also with outer port 46 of outer case 24 in plane A. If weight system 28 needs to be adjusted, plugs, fuel injectors or other structures or devices can be removed from ports 44, 46, and an implement can be extended through ports 44, 46 to engage a weight 30, for example by engaging either flats 40 or aperture 42 of weight 30. Weights 30 are then manipulated with the tool, in this case through rotation, to move from a locked position to an unlocked position within rail 32. In an unlocked position, and while the unlocked weight remains engaged with the tool, the rotor can be slowly rotated such that the rotor rotates while weight 30 stays in place. This results in circumferential movement of weight 30, through rail 32, relative to shaft 29 and the rotor. When the rotor reaches a point where weight 30 is in the desired new circumferential position, rotation of the rotor is stopped, and the implement extending through ports 44, 46 and still engaged with weight 30 can be used to configure weight back to the locked position, wherein weight 30 is locked in place within rail 32. Various iterations of this process can be conducted until the rotor reaches a desired level of balance.

This disclosure can be implemented using current engine geometry, for example, of the PW1100G-JM engine. It should also be appreciated, however, that the concept could be applied to most gas turbine engines. The high pressure compressor of such an engine has a rear plane trim balance weight feature comprising a slotted rail at the aft end of the HPC Rear Hub. This type of adjustable weight system is well suited for use in the present disclosure. As set forth above, a moveable weight with a locking set screw mounted in a circumferential rail allows the HPC rotor trim balance to be adjusted by changing the circumferential position of the weight in the rail.

In order to implement the present disclosure to an exemplary engine such as that discussed above, changes to the design of one or more of the inner case 26, or inner diffuser case, the outer case 24, and the high pressure compressor (HPC) rear hub can make the trim balance feature accessible from the outside without disassembly of the engine. The change to the inner case 26 could be, as a non-limiting example, to incorporate a boss that would accommodate a borescope plug that would be located in the axial gap between the aft end of the diffuser and in front of the combustor. The balance feature (i.e. rail 32) would be shifted forward to be aligned with the access port in the inner case. In the configuration illustrated in FIGS. 2 and 6, no change is required to the outer case 24, as port 46 is already in place in a desirable location. Thus, in this configuration, inner port 44 and weight system 28 can be positioned to align in a plane (plane A) with outer port 46.

Depending on the geometry, access to access port 44 in the inner case 26 can be gained either by removing a fuel nozzle or by adding a new borescope port to the outer case 24.

If access ports are being added to facilitate the present disclosure, it can be desirable to locate new access ports near the 3:00 or 9:00 position to facilitate access when the engine is either on-wing or in a test cell.

In one non-limiting aspect of the disclosure, permanent index reference marks can be added to the balance slot to facilitate adjustments to the position of the weights. Such index reference marks could be provided as shallow round-bottom holes or dimples, or the like, since such features will not cause a local increase in stress. One possible application of this concept would be to add two equal weights positioned 180 degrees apart when assembling the high pressure compressor (HPC) rotor. These two weights would be installed in addition to the weight used to complete the HPC rotor trim balance. They would not affect the balance of the rotor during initial assembly and balance but they would be available to trim the engine after it begins testing or operation. Current engines do not include provisions for making balance adjustments to the high pressure compressor or high pressure turbine (both intermediate rotors) except at the module level before completing engine assembly. If high rotor vibration exceeds limits at test or in service it is necessary to return the engine to the assembly floor for extensive disassembly. The fan at the front of the engine and the low pressure turbine at the back of the engine are accessible and it is possible to adjust the balance of these modules on an assembled engine. Extending trim balance capability to the rest of the engine as accomplished according to this disclosure, provides a significant cost savings in production, maintenance, and in service use of an engine.

The proposed disclosure can be incorporated in current engine designs as a product upgrade. The number of parts that require redesign to incorporate this capability is limited. The concept could also be incorporated in new designs.

One or more embodiments of the present invention have been described. Nevertheless, it will be understood that various modifications may be made without departing from the spirit and scope of the invention. For example, different sources of images and/or types of images can be utilized. Accordingly, other embodiments are within the scope of the following claims.

What is claimed is:

1. A balance system for an assembled engine, comprising:
   a rotor mounted on a shaft for rotation within an engine casing having an inner case and an outer case; and
   a weight system mounted on the shaft of the rotor and having at least one weight positionable relative to the rotor around a circumference of the shaft;

wherein the inner case has an inner access port, the outer case has an outer access port, and the inner access port, the outer access port and the weight system are positioned on the same radial plane of the shaft, whereby the weight system can be accessed through the outer port and the inner port to adjust circumferential position of the at least one weight relative to the shaft, and wherein the outer access port is a fuel injector port.

2. The system of claim 1, wherein the weight system comprises a rail mounted around at least a portion of the circumference of the shaft, and wherein the at least one weight is mounted to the rail and has a lock structure for locking the weight in position relative to the rail, wherein the lock structure can be locked and unlocked through the inner access port and the outer access port.

3. The system of claim 2, wherein, when the lock structure is unlocked, the at least one weight can be moved along the rail, and when the lock structure is locked, the at least one weight is fixed in place on the rail.

4. The system of claim 1, wherein the at least one weight can be accessed from outside the engine casing in a straight line through the outer access port and the inner access port.

5. The system of claim 1, wherein the rotor has a plurality of blades mounted around the shaft, and wherein the weight system is spaced axially from the blades.

6. The system of claim 1, wherein the engine is a gas turbine engine, and wherein the rotor is a high speed rotor of the gas turbine engine.

7. The system of claim 6, wherein the rotor is a high pressure compressor of the engine.

8. The system of claim 1, wherein the engine has a plurality of rotors positioned along an axis of the engine, and wherein the rotor is an intermediate rotor along the axis.

9. The system of claim 1, wherein at least one of the outer access port and the inner access port is a borescope port.

10. A method for balancing a rotor for an assembled engine, comprising the steps of:
accessing a weight system of a rotor mounted on a shaft for rotation within an engine casing having an inner case and an outer case, the weight system being mounted on the shaft and having at least one weight positionable relative to the rotor around a circumference of the shaft, the inner case having an inner access port, the outer case having an outer access port, and the inner access port, the outer access port and the weight system being positioned on the same radial plane of the rotor; and
changing circumferential position of the at least one weight relative to the shaft, wherein the outer access port is a fuel injector port, and further comprising the step of removing a fuel injector from the fuel injector port to allow access through the fuel injector port.

11. The method of claim 10, wherein the weight system comprises a rail mounted around at least a portion of the circumference of the shaft, and wherein the at least one weight is mounted to the rail and has a lock structure for locking the weight in position relative to the rail, wherein the lock structure can be locked and unlocked through the inner access port and the outer access port, the method further comprising the steps of:
accessing the lock structure from outside the engine casing, through the outer access port and the inner access port;
unlocking the lock structure;
moving the at least one weight along the rail to a different circumferential position relative to the shaft; and
locking the lock structure.

12. The method of claim 11, wherein the unlocking step comprises unlocking the lock structure with an implement inserted from outside the engine casing through the outer access port and the inner access port, and wherein the moving step comprises holding the at least one weight in place with the implement while the rotor is rotated so as to move the at least one weight to the different circumferential position.

13. The method of claim 10, wherein the rotor has a plurality of blades mounted around the shaft, and wherein the weight system is spaced axially from the blades.

14. The method of claim 10, wherein the engine is a gas turbine engine, and wherein the rotor is a high speed rotor of the gas turbine engine.

15. The method of claim 14, wherein the rotor is a high pressure compressor of the engine.

16. The method of claim 10, wherein the engine has a plurality of rotors positioned along an axis of the engine, and wherein the rotor is an intermediate rotor along the axis.

17. The method of claim 10, wherein the accessing and changing steps are carried out while the rotor is in a use position within the engine casing.

* * * * *